May 7, 1957 J. LESHIN 2,791,467
COCKTAIL SHAKERS
Filed June 11, 1956 2 Sheets-Sheet 1

INVENTOR.
JOSEPH LESHIN
BY Mock+Blum
ATTORNEYS

May 7, 1957  J. LESHIN  2,791,467
COCKTAIL SHAKERS
Filed June 11, 1956  2 Sheets-Sheet 2
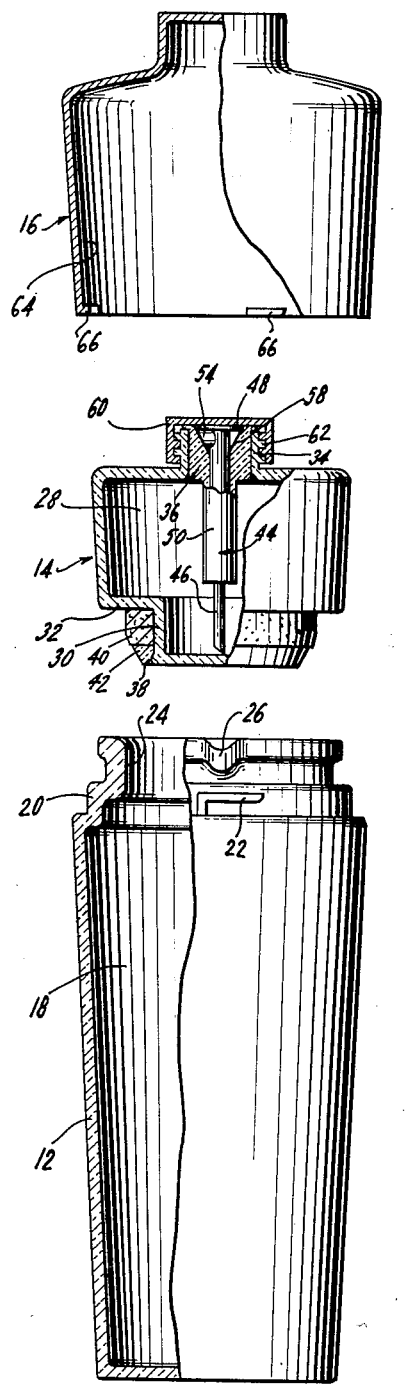
FIG. 3.
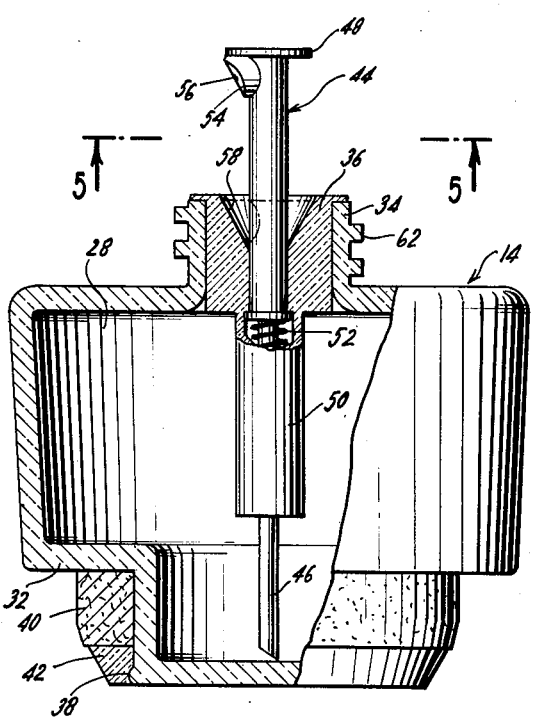
FIG. 4.
FIG. 5.
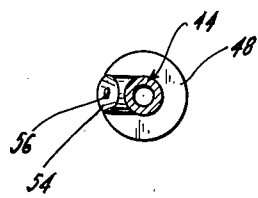
INVENTOR.
JOSEPH LESHIN
BY Mock+Blum
ATTORNEYS

2,791,467
COCKTAIL SHAKERS

Joseph Leshin, Bronx, N. Y., assignor to Park & Tilford Distillers Corporation, New York, N. Y., a corporation of Delaware Application June 11, 1956, Serial No. 590,560

7 Claims. (Cl. 299—97)

This invention relates to improvements in cocktail shakers.

It is the practice when mixing drinks, that a base liquid such as gin, be poured into the coctail shaker and then slight traces of additives, like vermouth, are also poured or added into the base of the shaker so that they may be mixed together after the cover of the shaker has been placed thereon. Very often the additives must be placed into the shaker in such small quantities that it is common to use a sprayer for this purpose.

The present invention therefore has as its object to provide a cocktail shaker wherein an additive liquid may be contained in the stopper of the shaker rather than in some unconnected jar or container.

In order to accomplish the fine addition of an additive to the base liquid it is an object of the present invention to provide a means for spraying the additive from the stopper into the shaker.

It is another object of the invention to provide a cocktail shaker having a cover and a base housing that combine to form a unitary shaker structure with the provision of a stopper insertable into the base housing when the shaker is not in use and for removal therefrom during the mixing of liquids.

It is another object of the invention to provide a member having a spraying means that may be completely retracted thereinto and covered when not in use. Accordingly a feature of the invention resides in the fact that the spraying means that is normally extended is made retractable into the member of which it forms a part to merge smoothly and attractively with the contour thereof.

Figure 1:
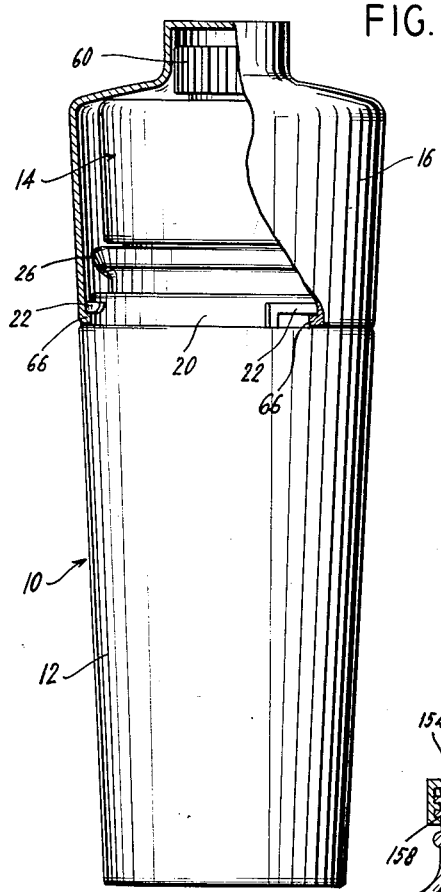
Figure 2:
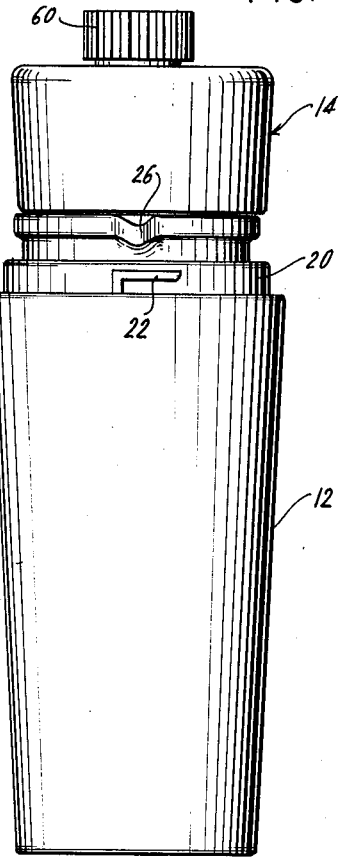
Figure 6:
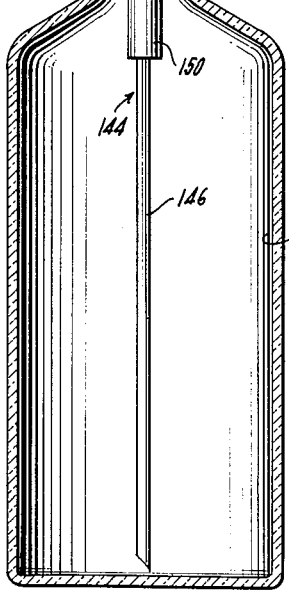

Other and further objects of my invention reside in the structures and arrangements hereinafter more fully described with reference to the accompanying drawings in which:

Fig. 1 is an elevational view of the cocktail shaker constructed in accordance with the teaching of the invention and with a part thereof broken away, Fig. 2 is an elevational view of the cocktail shaker shown in Fig. 1 with the cover thereof removed, Fig. 3 is an exploded elevational view of the cocktail shaker with parts thereof broken away, Fig. 4 is an elevational view of the stopper with a part thereof broken away, Fig. 5 is a sectional view taken along lines 5—5 of Fig. 4, and Fig. 6 is a vertical section of a container incorporating the novel spray features as constructed in accordance with the teaching of the invention.

Referring to Figs. 1 to 5 inclusive there is shown a cocktail shaker that is generally identified by the numeral 10. The cocktail shaker 10 comprises in a general way, a base housing member 12, a stopper 14 for the housing 12 and a cover or top housing member 16.

The housing member 12 is provided with a chamber 18 in which a basic liquor such as gin, may be poured for the mixing of a cocktail. The chamber 18 is tapered upwardly and outwardly and terminates in a first outer annular shoulder 20 having a plurality of circumferential spaced securing means or closure surfaced projections 22 formed thereon for a purpose which will be described. The shoulder 20 is necked radially inward into an annular opening 24 (Fig. 3) through which the base mixing liquid may be poured into the chamber 18. Defined at a point along the periphery of the annular opening 24 is a spout 26 by way of which the liquid contained in the chamber 18 may be poured therefrom into an additional receptacle.

In its normal inactive or closed condition there is located within the necked opening 24 of the housing 12, the stopper structure 14. Stopper 14 comprises a chamber 28 that terminates in a downwardly projecting annular extension 30 from a shoulder 32, while the sides of the stopper 14 taper upwardly and outwardly and are then necked radially inward to form a threaded neck portion 34. The neck 34 of the stopper 14 defines an opening through which liquid may be poured into the chamber 28, the chamber 28 then being fully enclosed by the application of a plug 36 into the opening formed by the neck 34. Thus, liquid contained in the chamber 28 will be enclosed therein and normally not vented to the surrounding atmosphere.

The annular extension 30 terminates at its lowermost portion in a limiting bead 38 that is designed to limit the axial or longitudinal movement of a seal ring 40 that abuts at its upper surface against the shoulder 32 and is retained in such abutting relationship by a retaining ring 42. The ring 42 may be of a resilient or pliable plastic material that tightly engages against the bead 38 and is limited thereby from axial movement or displacement from its circumposed position about the annular extension 30. Likewise, this axial retention of the retaining ring 42 serves to maintain the seal ring 40, made of any suitable material such as cork, in its normal abutting relationship with the upper shoulder 32.

Both the retaining ring 42 and the seal ring 40 are tapered downwardly that they may guide the annular extension 30 of the stopper 14 into sealing engagement with the opening 24. With the stopper 14 positioned within the opening 24, the seal 40 engages with the peripheral wall of the opening to provide a fluid-tight seal therebetween. Hence liquid contained in the chamber 18 of the base housing 12 will be tightly sealed therein.

Mounted for axial movement in the plug 36 of the stopper 14 is a spray means or pump structure generally indicated as 44. The pump structure 44 may be of any suitable design to permit communication between the liquid contained in the chamber 28 with the outside of the stopper 14. Hence, although the actual structural details of the pump structure do not form a part of the invention, for the purpose of providing a clear understanding, there is shown a stem 46 that extends into the chamber 28 and a pumping finger having a flanged top 48.

The spray means 44 is guided for reciprocating axial movement in a boss 50 of the plug 36 and normally has its finger 48 urged outwardly and away from the plug 36 by the application of pressure created by a spring 52 positioned therebetween. The spray means 44 is provided with a laterally projecting spraying member 54 having a nozzle 56.

The plug 36 has defined in its upper surface a downwardly directed conical opening 58 with the sprayer 44 passing through the apex thereof and into which the projection 54 and flange 48 are adapted to be retracted as shown in Fig. 3. Hence, the contour of the projection or nozzle member 54 is such as to conform to the contour of the conical opening 58, and once seated therein, the nozzle 56 is placed in its inactive position. Accordingly the flanged top 48 will seat across the top of the conical opening 58 to merge with the outer visible surface thereof, thereby forming a smooth substantially uninterrupted plug top.

With the spray means 44 retracted into the plug 36 and in its inactive position, it may be capped by a capping member 60 having a threaded interior that cooperates with the threads 62 provided on the outer diameter of the neck 34. When the cap 60 is disengaged from the threads 62 and removed from about the neck 34, the spray means 44 is automatically raised out of its retracted position in the plug 36 into its normal active position as shown in Fig. 4.

Thus by merely pressing on the finger or flanged top 48, a fine spray of the additive liquid housed in the chamber 28 may be sprayed to mix with the liquid in the chamber 18 of the housing 12. So, for example, vermouth may be enclosed within the chamber 28 and may be mixed with gin poured into the chamber 18 by spraying the same thereinto. The fine spraying will thus permit substantially controlled admixture of the additive vermouth with the already present gin in the housing 18.

The cover member or top housing 16 has a housing chamber 64 of sufficient area to accommodate the stopper member 14 therein when the same is positioned within the annular opening 24 of the base housing 12. Housing 16 terminates at its upper end in a cap formation in which the cap 60 is accommodated. Provided on the internal surface and along the lower edge thereof are a plurality of securing means or closure surfaces 66 which may be formed as raised beads or protections adapted to fit within and cooperate with the securing means 22 to tightly secure the cover member 16 to the housing 12.

Hence the cover 16 cooperates with the housing 12 to form therewith a unitary chamber when the stopper 14 is removed from the housing 12, or to provide a cover for both the housing 12 and the stopper member included therein resulting in a unitary portable shaker structure.

Referring now to Fig. 6, the embodiment 114 there shown is substantially the same in operation as the stopper 14 shown in Figs. 1 to 5 inclusive and as previously described. It comprises a liquid chamber 128 that terminates at its upper end in an annular necked portion 134. The annular portion 134 defines an opening through which liquid is admitted to the chamber 128. The neck 134 is threaded about its outer surface thereof as at 162, to cooperate with the internally threaded cap 160.

Once liquid has been admitted to the desired height in the chamber 128, a plug 136 is applied to the opening of the neck 134 thereby closing the chamber to the outer atmosphere and enclosing the liquid therein. The plug 136 guidingly supports a spray means or spray pump structure generally identified 144 for reciprocating movement therein. The spray means 144 may be of any well known design adapted to spray the contents by way of a siphon stem 146 to the outside of the container 114.

The spray means comprises a pumping finger having a flanged top 148 to serve as a pumping element. The spray finger 148 is normally extended beyond the top of the plug 136 by the normal urging of a spring (not shown) provided in a boss 150 of the plug. Hence the normal expanded position of the flanged top pumping finger 148 is shown in dot-dash lines. The spray structure 144 includes a nozzle member 154 having a nozzle (not shown), but similar in construction to the nozzle 56 previously described.

In its retracted condition, the pumping finger 148 is moved into the confines of the plug 136 to permit the upper surface of the flanged portion 148 to conform substantially to the flat upper surface of the plug 136, thereby merging with the plug and forming a substantially smooth top therewith. The plug 136 has a conically shaped opening 158 that receives the member 144 at the apex thereof, while the nozzle member 154 is conformably shaped to that of the conical opening 158 so that the same may fit within the confines of the opening when the spray structure 144 is in its retracted full-line position.

The cap 160 cooperating with the threads 162 on the neck 134, may then be threaded about the container 114 to secure the spray member in its retracted condition and to provide a smooth cover therefor, thereby eliminating the unnecessary extension of the spray means 144 from the top of the container 114.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. A cocktail shaker comprising the combination of a liquid receiving base housing having a liquid receiving opening, a stopper in said opening, said stopper including an enclosed liquid chamber, means in said stopper communicating with said chamber to spray the contents therefrom, closure surfaces on said housing, and a cover forming a housing in which said stopper is received and including closure surfaces cooperable with said closure surfaces on said base housing to secure said two housings together.

2. A cocktail shaker comprising the combination of a first liquid receiving housing having a necked opening and a pouring spout, a stopper including an enclosed mixer liquid chamber having an annular extension formed at the base thereof, sealing means on said annular extension adapted to sealingly engage said necked opening when said stopper of the annular extension is inserted thereinto, spray means in said stopper providing communication with said chamber to spray the contents therefrom, a cover forming a second liquid receiving housing cooperable with said first liquid receiving housing to form a single cocktail shaker chamber, and closure means on said first and second housings to secure the same together.

3. A stopper for a cocktail shaker having a necked opening, the stopper comprising a cocktail mixer liquid chamber, the lower portion of such chamber being formed with a longitudinally directed annular extension adapted to fit within the necked opening of the shaker, sealing rings on said extension for sealing engagement with the necked opening of the shaker when said extension is fitted thereinto, said stopper having an opening and a threaded surface, a plug insertable into said stopper opening to close said chamber, spray means in said plug communicating with said chamber to spray the contents therefrom, and cap means cooperable with said threaded surface to cover said spray means.

4. A stopper as in claim 3, said annular extension having a raised bead extending about the periphery of the lowermost annular portion thereof, a shoulder longitudinally spaced from said bead, a seal ring circumposed about said annular extension against said shoulder and spaced longitudinally from said bead, and a retainer ring circumposed about said annular extension in abutment with said seal ring and with said bead.

5. In a member having a liquid containing chamber, a neck opening, plug means in said opening to enclose said chamber and the liquid contained therein, spray means movable in said plug between retracted and extended positions, said spray means including a stem communicating with the liquid in said chamber and a head having a spray opening, a hole defined in said plug to receive said spray head for retraction thereinto, means normally urging said head out of said hole, and cap means cooperable with said member to cover said plug and spray head when the latter is retracted into said plug hole.

6. In a member as in claim 5, said spray head having a flanged top and a spray nozzle projecting laterally from beneath said top, said plug hole being conically shaped downwardly and having said spray head movable through the apex thereof, said nozzle projection being formed to conform with the shape of said conical hole, and said flanged top being retractable into said hole to form a smooth top for said plug.

7. A cocktail shaker comprising the combination of a liquid receiving housing having a liquid receiving opening, a stopper in said opening, said stopper including an enclosed liquid chamber, spray means in said stopper communicating with said chamber to spray the contents therefrom, said spray means being retractable into said stopper, cap means on said stopper to retain said spray means in said retracted position, spring means normally urging said spray means from said retracted position, closure surfaces on said housing, and a cover forming a housing in which said stopper may be received and including closure surfaces cooperable with said closure surfaces on said first named housing to secure said two housings together.

No references cited.